United States Patent [19]
Martin

[11] Patent Number: 5,967,194
[45] Date of Patent: Oct. 19, 1999

[54] SELF-SEALING TUBING

[75] Inventor: Lee H. Martin, West Chester, Pa.

[73] Assignee: Federal-Mogul Systems Protection Group, Inc., Exton, Pa.

[21] Appl. No.: 09/012,714

[22] Filed: Jan. 23, 1998

[51] Int. Cl.$^6$ ............................................. F16L 11/12
[52] U.S. Cl. .................... 138/156; 138/167; 138/168; 138/110
[58] Field of Search .................... 138/156, 128, 138/121, 122, 167, 168, 110

[56] References Cited

U.S. PATENT DOCUMENTS

| | | | |
|---|---|---|---|
| 2,782,805 | 2/1957 | Leadbetter | 138/74 |
| 3,092,530 | 6/1963 | Plummer | 154/44 |
| 3,369,568 | 2/1968 | Davis et al. | 138/168 |
| 4,457,068 | 7/1984 | Maier, Jr. | 29/825 |
| 4,513,787 | 4/1985 | Hegler et al. | 138/166 |
| 4,778,700 | 10/1988 | Pereira | 428/40 |
| 4,791,236 | 12/1988 | Klein et al. | 138/166 X |
| 4,830,061 | 5/1989 | Karakawa | 138/168 |
| 4,920,235 | 4/1990 | Yamaguchi | 174/36 |
| 4,944,976 | 7/1990 | Plummer, III | 138/110 X |
| 4,967,799 | 11/1990 | Bradshaw et al. | 138/121 |
| 4,970,351 | 11/1990 | Kirlin | 174/68.3 |
| 4,985,942 | 1/1991 | Shaw | 138/110 X |
| 5,277,227 | 1/1994 | Bradshaw et al. | 138/110 |
| 5,303,730 | 4/1994 | Trueb et al. | 137/375 |
| 5,435,871 | 7/1995 | Streit | 156/201 |
| 5,535,787 | 7/1996 | Howell | 138/110 X |
| 5,613,522 | 3/1997 | Ford et al. | 138/123 |
| 5,727,599 | 3/1998 | Fisher et al. | 138/110 X |

FOREIGN PATENT DOCUMENTS

| | | | |
|---|---|---|---|
| 0 291 418 | 11/1988 | European Pat. Off. | H02G 3/04 |
| 2 745 429 | 8/1997 | France | H02G 3/04 |
| 2 745 962 | 9/1997 | France | H02G 3/04 |
| 8 903 070 | 6/1989 | Germany | H02G 3/04 |

*Primary Examiner*—Patrick Brinson
*Attorney, Agent, or Firm*—Synnestvedt & Lechner LLP

[57] ABSTRACT

A tubular article of resilient material used as a protective sheathing for wires, hoses or other elongated substrates is provided with substantially circumferentially extending corrugations and a longitudinally slit side wall to allow for installation over the substrates. Fastening means in the form of hook-and-loop fastening tape is applied to the abutting edges of the slit so that the hooks and loops interlock when the slit is closed. The hook-and-loop tape protects the fingers of the worker during installation of the tubular article, prevents relative movement of the slit edges caused by turning and twisting forces, thereby eliminating undesirable noise during use and the need for taping following installation.

2 Claims, 2 Drawing Sheets

SELF-SEALING TUBING

FIELD OF THE INVENTION

This invention relates to flexible, protective tubing useful for the protection of elongated members, such as electrical wiring or hoses, and in particular to protective tubing of the type having a convoluted or corrugated wall profile and a longitudinal slit to allow for installation over the elongated member being protected.

BACKGROUND OF THE INVENTION

Corrugated or convoluted tubular members made of a relatively high modulus plastic material are commonly used, for example, as sleeving in the automotive industry. Typically, relatively stiff materials are chosen for the sleeving to provide abrasion resistance for the components being protected. Such materials are usually employed for the additional reason that their durability gives protection over long periods of time, desirably over the life of a vehicle in which the tubular members are utilized. In the selection of such tubing, a preferred form is fabricated with a convoluted or corrugated wall profile, wherein the corrugations or convolutions extend substantially circumferentially so as to impart to the product a flexibility which allows it to follow a path which may include one or more relatively sharp bends without collapsing at the bend points.

In the installation over hoses, pipes or wires in a typical engine compartment, the components being protected are often previously installed, and the protective tubing is longitudinally slit so that the edges of the slit can be separated manually by a worker and the tubing is thus slipped over the articles in need of protection. The slit is then allowed to close and tape is applied so that the tubing does not fall off the article being protected.

Various problems exist in the installation and use of the protective tubing just described. In the first place, manual separation of the slit edges by the worker tends to cause injury to the fingers owing to the relatively sharp edges of the slit when using the relatively stiff materials preferred for the purposes of imparting durability and abrasion resistance to the product. Second, taping to insure against opening of the slit is a labor-intensive step which is undesirably expensive. Finally, during use of the vehicle, bending and twisting forces occur, particularly when the vehicle is moving over relatively rough surfaces create undesirable noises due to the edges of the slit rubbing against one another. These forces may even open the slit sufficiently to allow small articles, such as wires, to be pinched and even severed.

SUMMARY AND OBJECTS OF THE INVENTION

According to the invention, a resilient tube of relatively high modulus, engineered plastic material comprises a longitudinally slit side wall, wherein the slit has side edge portions resiliently biased into abutting relationship and are capable of manual separation against the bias to allow for installation of the sleeving over elongated articles, such as wires or tubing. Means are provided for releasably fastening the side edges together comprised of interlocking, interconnectable elements extended lengthwise of the slit edges. Preferably, the interconnecting elements are comprised of complimentary hook-and-loop type fastener strips respectively adhesively joined to the side edges and projecting normally therefrom into interlocking relationship with one another. A predetermined separation force greater than the biasing force allows for disconnection of the interconnectable elements and installation of the tubing over the substrates to be protected.

An important objective and advantage of the invention described above is the provision of a longitudinal slit sleeve with a self-sealing fastening system for automatically closing the slit without the need of taping or the use of other supplemental fasteners.

A still further object and advantage achieved by sleeving constructed according to the invention is that a soft feel is imparted to the edges of the slit making it easier for workers to fit the sleeving over articles to be protected without cutting or bruising the fingers.

A still further advantage of sleeving provided with the features of the invention is the elimination of undesirable noise associated with the slit edges rubbing against each other when exposed to the twisting and bending forces experienced during operation of a vehicle.

Achievement of the above and other objects and advantages of the invention will become further apparent upon reference to the following detailed description of the illustrative embodiment of the invention and to the accompanying drawings.

DETAILED DESCRIPTION OF THE PREFERRED EMBODIMENT OF THE INVENTION

Figure 1:
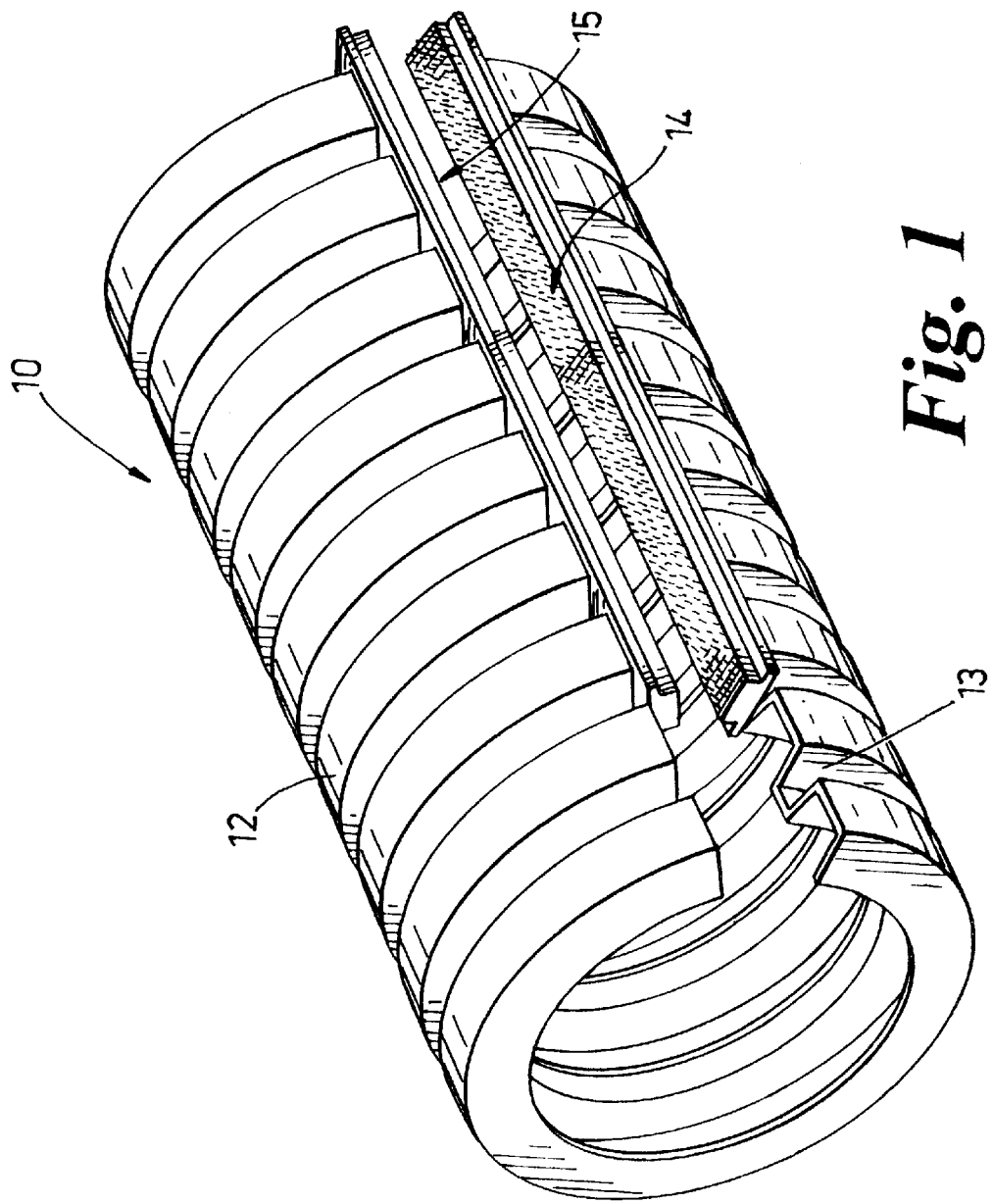
FIG. 1 is a perspective view of a convoluted or corrugated tubular article incorporating the principles of the invention.
Figure 2:
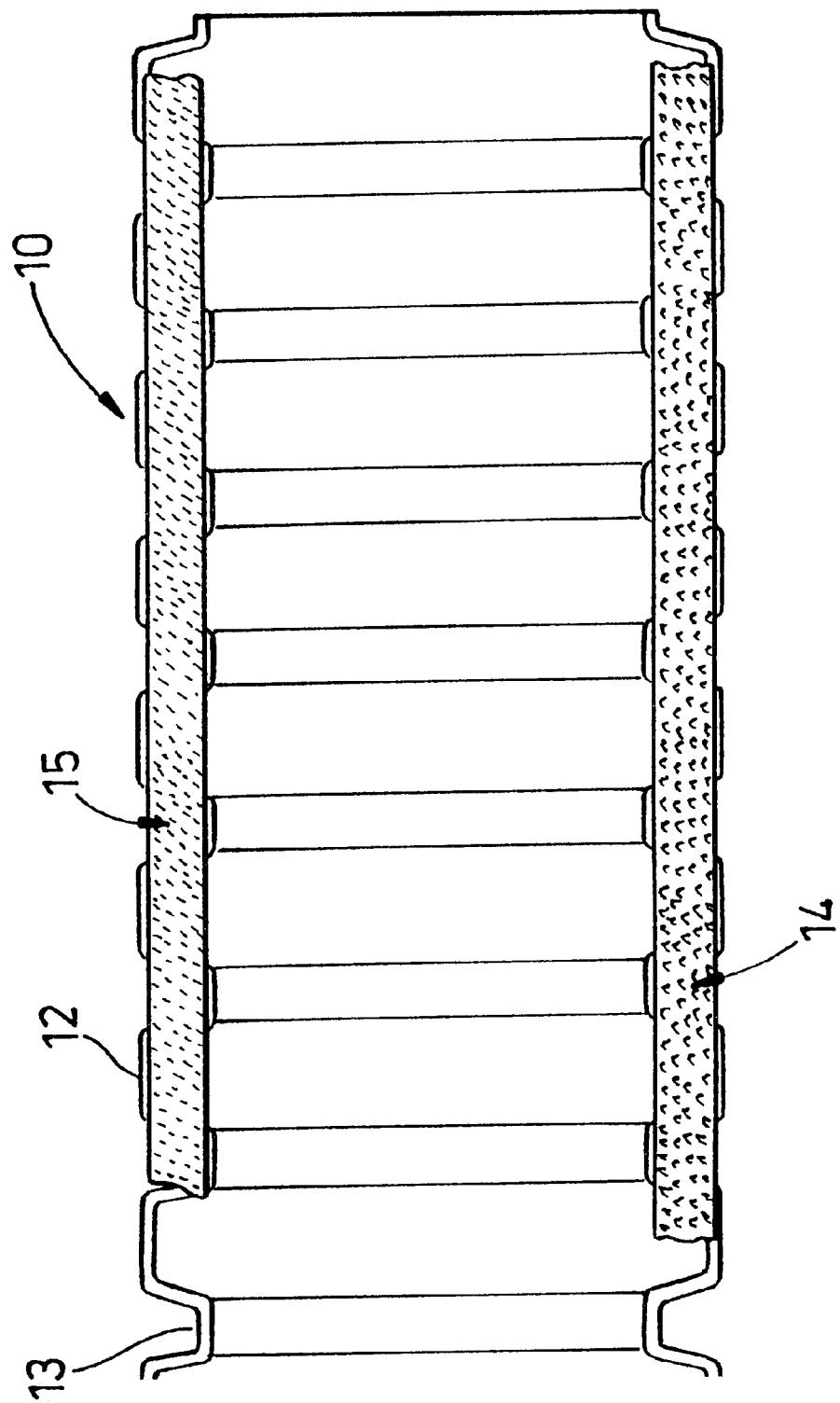
FIG. 2 is a longitudinal cross-sectional view of the tubular article of FIG. 1.

In carrying out the invention, reference is made to FIGS. 1–3 showing a portion of a tubular article 10 having a wall section in which generally circumferentially extending corrugations or convolutions comprised of alternating ridges and valleys 12 and 13 are formed. Such tubing is well known in the art and the terms "corrugation", "corrugated" and "convolution" or "convolute" are intended to have the same meaning and are used interchangeably in the specification and in the claims which follow. Tubular articles of the kind to which the invention pertains are well known in the art and are preferably made from relatively high modulus plastic materials of the kind commonly referred to as "engineered plastics". The preferred materials are generally relatively stiff to prevent collapse and to provide abrasion resistance and the corrugations are provided to impart the requisite flexibility to fit over articles having relatively sharp bends. Examples of such materials useful for carrying out the invention are polyolefins, polyamides, polyesters, polyketones, poly(vinyl chloride) and fluoropolymers. So that they can be installed over previously installed wires and tubing, such tubular articles are customarily supplied with a continuous, lengthwise extending end-to-end slit which is biased to the closed position. By manual separation of the slit edges, a worker can fit the article over the object to be protected. The resiliency of material is chosen so that the slit closes once manual pressure on the side edges is released. According to conventional practice, once a tubular article is installed, several wraps of adhesive tape are applied so that the article does not come apart and fall off the article it is protecting. Similarly, a wire harness is spirally taped before it is placed into the convoluted tubular article to minimize the chance of a single wire extending through the slit and being pinched or broken by the relatively sharp edges of the slit.

A typical tubing suitable for the purpose is formed of poly(vinyl chloride), has corrugations extending at about 8 turns/inch, an outer diameter of about 1 inch, and a wall thickness of about 0.010".

In carrying out the invention, convoluted tubing of the kind described is provided with sealing means which, in the preferred form, include lengths of complementary hook-and-loop textile tape 14, 15 of the kind commonly marketed under the trademark VELCRO®. The hook-and-loop tapes are preferably adhesively secured to the abutting edge portions by adhesives well known in the art, so that the hook tape 14 lining one edge portion and loop tape 15 lining the other project normally from the edges of the slit into engagement with one another so that they interlock under the natural biasing forces. The hook-and-loop tape strips cover substantially the sharp edges of the convoluted edge portions of the slit and have a relatively soft feel which protects the workers' fingers when the edges are separated during installation of the tubular article. When installation is complete and the edges released, the slit automatically closes due to the bias of the wall material and the hook-and-loop fastening elements automatically interlock under the natural biasing forces of the article without further action on the part of the worker. Taping, as an additional step in the sealing process, is unnecessary and the risk of wires or tubes projecting outwardly from the slit is avoided. Similarly, rubbing of the edges caused by the forces which flex the tubular article in use are greatly inhibited, eliminating a source of troublesome noise within an engine compartment. One or more wires of a bundle may be broken out of the slit without risk of abrasion due to the relatively soft nature of the fastening tape.

I claim:

1. A tubular article comprising a relatively resilient, high modulus engineered plastic material, said tubular article defining a protective sheathing for elongated substrates, said tubular article comprising:

a longitudinally slit side wall having inner and outer wall surfaces, the slit having side edge portions resiliently biased into an abutting relationship, said side edge portions interconnecting the inner and outer wall surfaces and being manually separable against the bias to allow for access to the interior of the tubular article; and means for releasably fastening said side edge portions comprising self-sticking, releasable strip elements on each of said side edge portions, said strip elements having complementary interlocking, interconnecting elements projecting normally from said side edge portions and being disposed on said side edge portions in facing relationship, said interconnecting elements being adapted for releasable interconnection for securing said side edge portions together in the absence of a separation force above a predetermined level.

2. A tubular article according to claim 1 having a corrugated side wall, said corrugated side wall comprising integrally formed substantially circumferentially extending peaks and valleys.

* * * * *